United States Patent
Thrall et al.

(10) Patent No.: US 7,307,668 B2
(45) Date of Patent: Dec. 11, 2007

(54) SHIFTING LETTERBOX VIDEO TO PROLONG DISPLAY LIFE

(75) Inventors: Jesse Lee Thrall, Tucson, AZ (US); Daniel James Winarski, Tucson, AZ (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 682 days.

(21) Appl. No.: 10/883,113

(22) Filed: Jun. 30, 2004

(65) Prior Publication Data

US 2006/0002687 A1    Jan. 5, 2006

(51) Int. Cl.
*H04N 5/46* (2006.01)
*H04N 3/20* (2006.01)

(52) U.S. Cl. .................. 348/556; 348/173; 386/123

(58) Field of Classification Search .............. 348/913, 348/445, 556, 173, 607; 386/123; *H04N 7/01, H04N 11/20, 5/46, 3/20, 5/21*
See application file for complete search history.

(56) References Cited

U.S. PATENT DOCUMENTS

| | | | | |
|---|---|---|---|---|
| 5,168,362 A | * | 12/1992 | Yoshida | 348/445 |
| 5,249,049 A | | 9/1993 | Kranawetteri et al. | 358/141 |
| 5,631,710 A | * | 5/1997 | Kamogawa et al. | 348/555 |
| 5,956,092 A | * | 9/1999 | Ebihara et al. | 348/445 |
| 6,262,772 B1 | | 7/2001 | Shen et al. | 348/445 |
| 6,288,715 B1 | | 9/2001 | Bain et al. | 345/211 |
| 7,057,640 B2 | * | 6/2006 | Bellwood et al. | 348/173 |
| 2001/0035874 A1 | | 11/2001 | Hamilton et al. | 345/682 |

FOREIGN PATENT DOCUMENTS

| | | |
|---|---|---|
| JP | 9006304 | 1/1997 |
| JP | 2001100720 | 4/2001 |
| JP | 2001136460 | 5/2001 |
| JP | 2003174601 | 6/2003 |

\* cited by examiner

*Primary Examiner*—Sherrie Hsia
(74) *Attorney, Agent, or Firm*—Carlos Munoz-Bustamante; Dillon & Yudell LLP

(57) ABSTRACT

A system, a method and an article of manufacture for uncentering an image of a video stream on a video display is provided. The image of the video stream is displayed uncentered on a video display at a position that depends on the aspect ratio of the video stream and the aspect ratio of the display used to view the video stream. Once uncentered, the image of the video stream is not shifted for the duration of the video session unless a user provides input to change the position. Various positions of the image of a video stream are available to accommodate user preferences or to prolong the life of the video display.

33 Claims, 11 Drawing Sheets

SHIFTING LETTERBOX VIDEO TO PROLONG DISPLAY LIFE

TECHNICAL FIELD

This invention relates to displaying video streams and methods related thereto. In particular, the invention relates to determining the aspect ratio of the video display and the video stream and shifting the location of the image of the video stream on the display to maximize the life of the display or to avoid known defects in the display.

BACKGROUND

With the advent of widescreen displays in which the display screen has an aspect ratio of 16:9 and a plurality of video-stream aspect ratios, there are often black bands typically above and below the displayed image of the video stream or alternately to the left and right of the displayed image of the video stream. For example, when viewing a video stream with a larger aspect ratio than the display it is being viewed on, these black bands appear above and below the centered image of the video stream to produce what is informally known as a letterbox image. When viewing a video stream with a smaller aspect ratio than the display it is being viewed on, these black bands appear to the left and the right of the centered image of the video stream. In those cases where the video stream and the display have the same aspect ratio, no black bands occur.

This current method of centering the displayed image of the video stream when the aspect ratio of the video stream and the display are different can lead to uneven aging of pixels and possible pixel burnout on cathode ray tube (CRT) high definition televisions (HDTVs) and plasma screens. The uneven aging of pixels is observable as burned-in images of the bars bracketing the letterbox image and additional burn in effects in the area where the image is displayed. The bars may eventually "burn" into the screen, becoming visible when an image of a different aspect ratio is viewed. CRT screens and plasma screens are both susceptible to burn-in. Conversion circuitry that is capable of expanding a displayed image both horizontally and vertically may be used to eliminate the black bands. The conversion circuitry typically alters the image's aspect ratio to match that of the screen to eliminate the bars; however, this will result in distorted unnatural looking images. Therefore there is a need to improve the displaying of images with aspect ratios that are different than the aspect ratio of the display component.

SUMMARY OF THE INVENTION

The present invention provides a system, a method and an article of manufacture for uncentering an image of a video stream on a video display. The image of the video stream is displayed uncentered on a video display at a position that depends on the aspect ratio of the video stream and the aspect ratio of the display used to view the video stream. Once uncentered, the image of the video stream is not shifted for the duration of the video session unless a user provides input to change the position. Various positions of the image of a video stream are available to accommodate user preferences or to prolong the life of the video display. Synonyms for display are screen and display screen. A synonym for video stream is images.

In method form, exemplary embodiments include a method for displaying an image of a video stream on a display, comprising: obtaining an aspect ratio of the display; obtaining an aspect ratio of the video stream; determining whether the aspect ratio of the display is different than the aspect ratio of the video stream; and responsive to determining that the aspect ratio of the display is different than the aspect ratio of the video stream, positioning the image of the video stream on the display to uncenter the image on the display. Additional exemplary method embodiments include selecting a random position of the image on the display at a selected interval and displaying the image on the display at the random position.

In system embodiments the present invention provides display system, comprising: a display for displaying an image of a video stream and a player coupled to the display. The player further comprising: a display buffer for buffering and processing the video stream and providing the video stream to the display; a processor for controlling the display buffer, wherein the processor is configured to: obtain an aspect ratio of the display; obtain an aspect ratio of the video stream; determine whether the aspect ratio of the display is different than the aspect ratio of the video stream; and responsive to determining that the aspect ratio of the display is different than the aspect ratio of the video stream, positioning the image of the video stream on the display to uncenter the image on the display.

For a fuller understanding of the nature and advantages of the present invention, reference should be made to the following detailed description taken together with the accompanying drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

Figure 1:
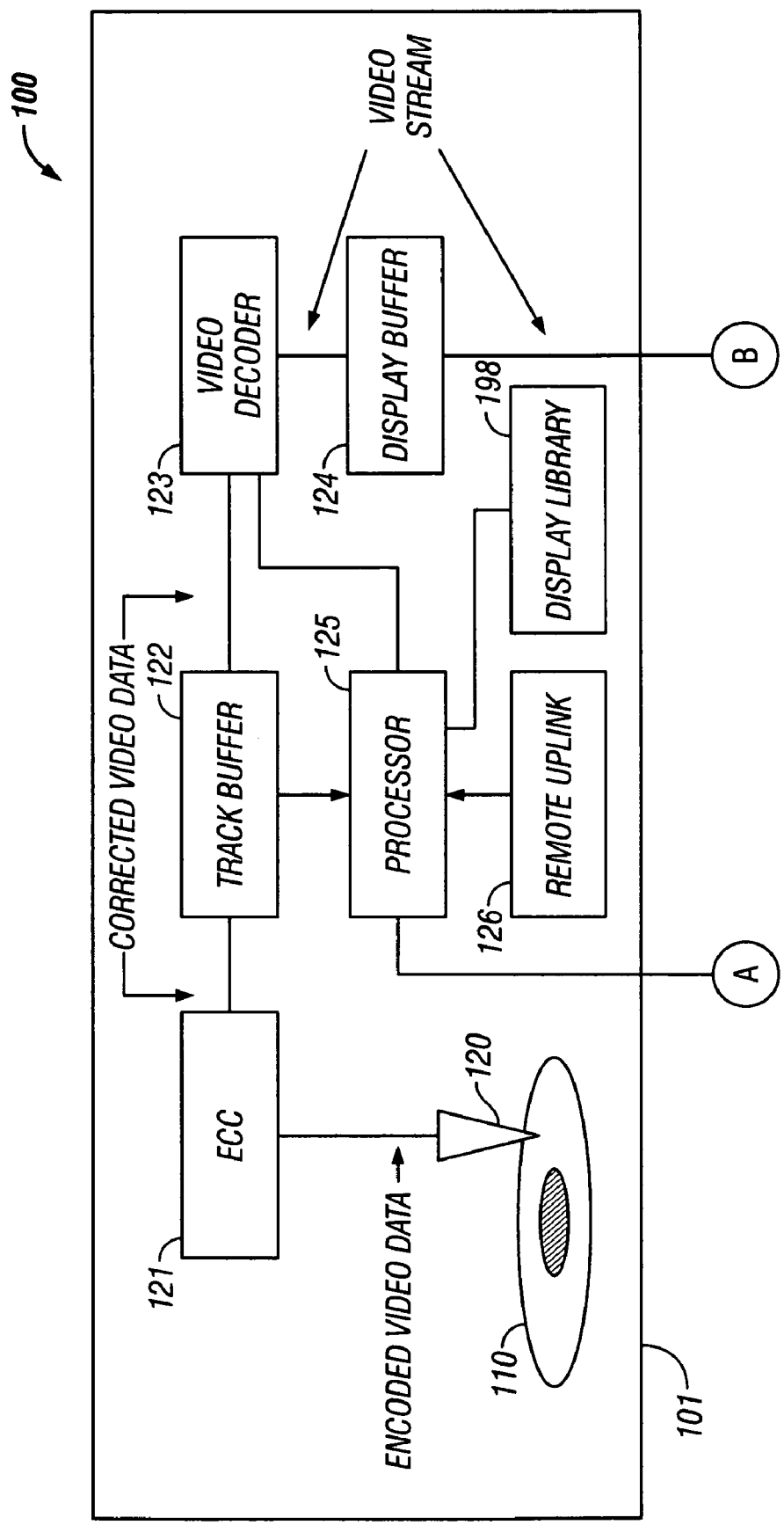
FIG. 1 shows a view of a representative video display system.
Figure 1:
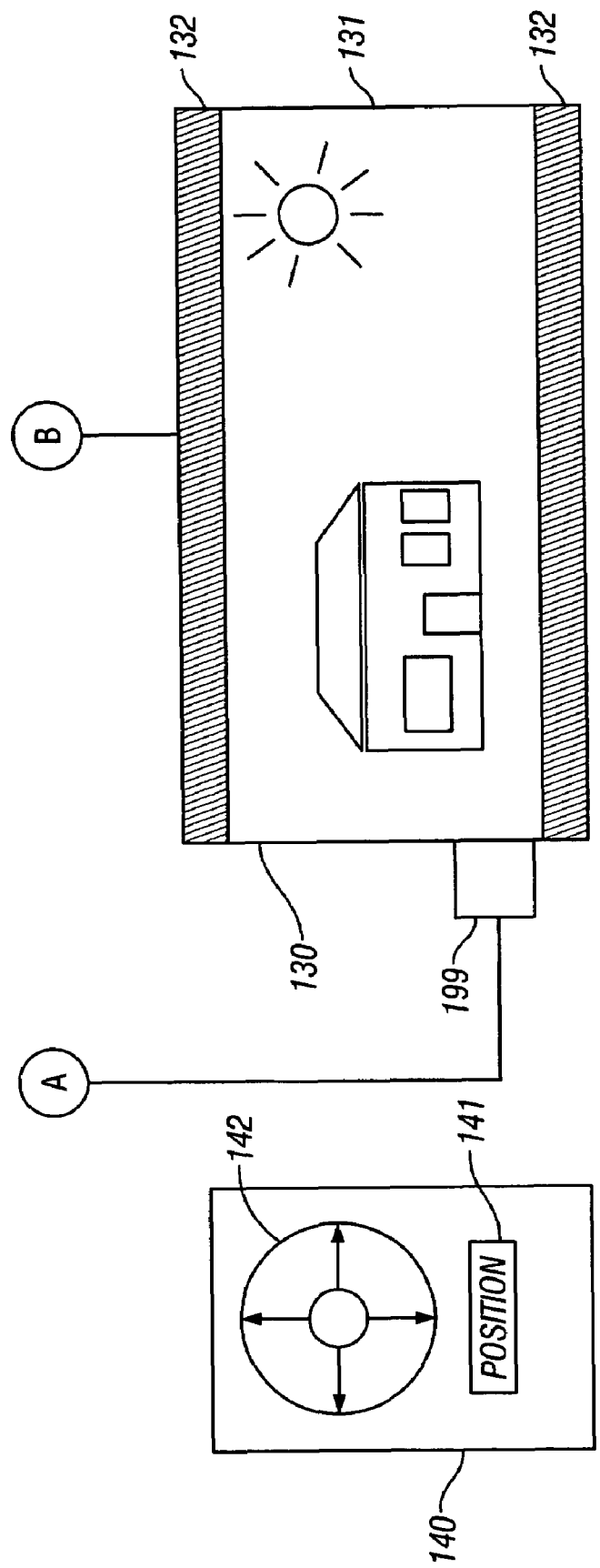

Referring first to FIG. 1, an example of a display system 100 that may be used to implement the present invention is shown. Display system 100 may comprise display 130, player 101 coupled to display 130 and remote control 140. Player 101 provides a source of video data and may comprise a DVD (digital video disk), VHS (video home system)

tape player playing a VHS tape, a satellite video receiver, CD (compact disk) Video, etc., as are commercially available. For example, DVD player Model # DVP-NS575P/S manufactured by the Sony Corporation may be used for player 101. Display 130 may be a television (TV), a computer CRT display, a plasma display, a projection TV, or any other display for displaying video information. Remote control 140 may be a remote control for display system 100 that uses wireless, direct wire connection, optical communication, etc., for communication with display system 100.

In one embodiment (FIG. 1) of player 101, encoded video data is read from disk 110 by laser 120. Laser 120 may comprise any laser for reading and or writing optical information. For example laser 120 may comprise a laser producing a wavelength of light spanning beyond the visible spectrum (i.e. infrared to ultraviolet) for use with DVD video disks or other optical disks. Error Correction Code (ECC) 121 is first applied to the encoded video data (information on ECC may be found in U.S. Pat. Nos. 4,358,848 and 3,755,779) to produce corrected video data with minimum errors. After ECC processing, the corrected video data may be stored in track buffer 122 before it is decoded by video decoder 123. Video decoder 123 is typically an MPEG (Moving Picture Experts Group) decoder, such as MPEG-1 (ISO/IEC 11172), MPEG-2 (ISO/IEC 13818), or MPEG-4 (ISO/IEC 14496). A typical MPEG-2 video decoder is the Vaddis5R, chip number ZR36750, manufactured by the Zoran Corporation.

Track buffer 122 is used to compensate for disk access discontinuities such as when laser 120 jumps from one layer to another in a dual-layer DVD video disk. Video decoder 123 processes corrected video data to produce a video stream suitable for display on display 130. In the preferred embodiment a DVD video disk may supply the video data to video decoder 123. Video decoder 123 processes the video data to produce a video stream. The video stream is transmitted to display buffer 124, where additional processing may occur. For example, the corrected video data may be processed to produce horizontal or vertical shifting of the video picture displayed on display 130. After the additional processing, the image of the video stream is displayed on display 130. Display 130 is typically connected to player 101 via electrical cabling. However, display 130 may be connected via optical cabling or may be wirelessly connected. Alternatively, a VHS tape may supply the video data to video decoder 123. Video decoder 123 processes the video data from any source (i.e. VHS, DVD, etc.) to produce a video stream.

Processor 125 controls display buffer 124 to control the buffering and processing of the video stream by display buffer 124. After buffering and processing the video stream, display buffer 124 provides the video stream to display 130. Additionally, processor 125 receives input from remote 140 via remote uplink 126. Remote uplink 126 is coupled to processor 125 and receives information from remote control 140 responsive to user input at remote control 140.

Figure 4:
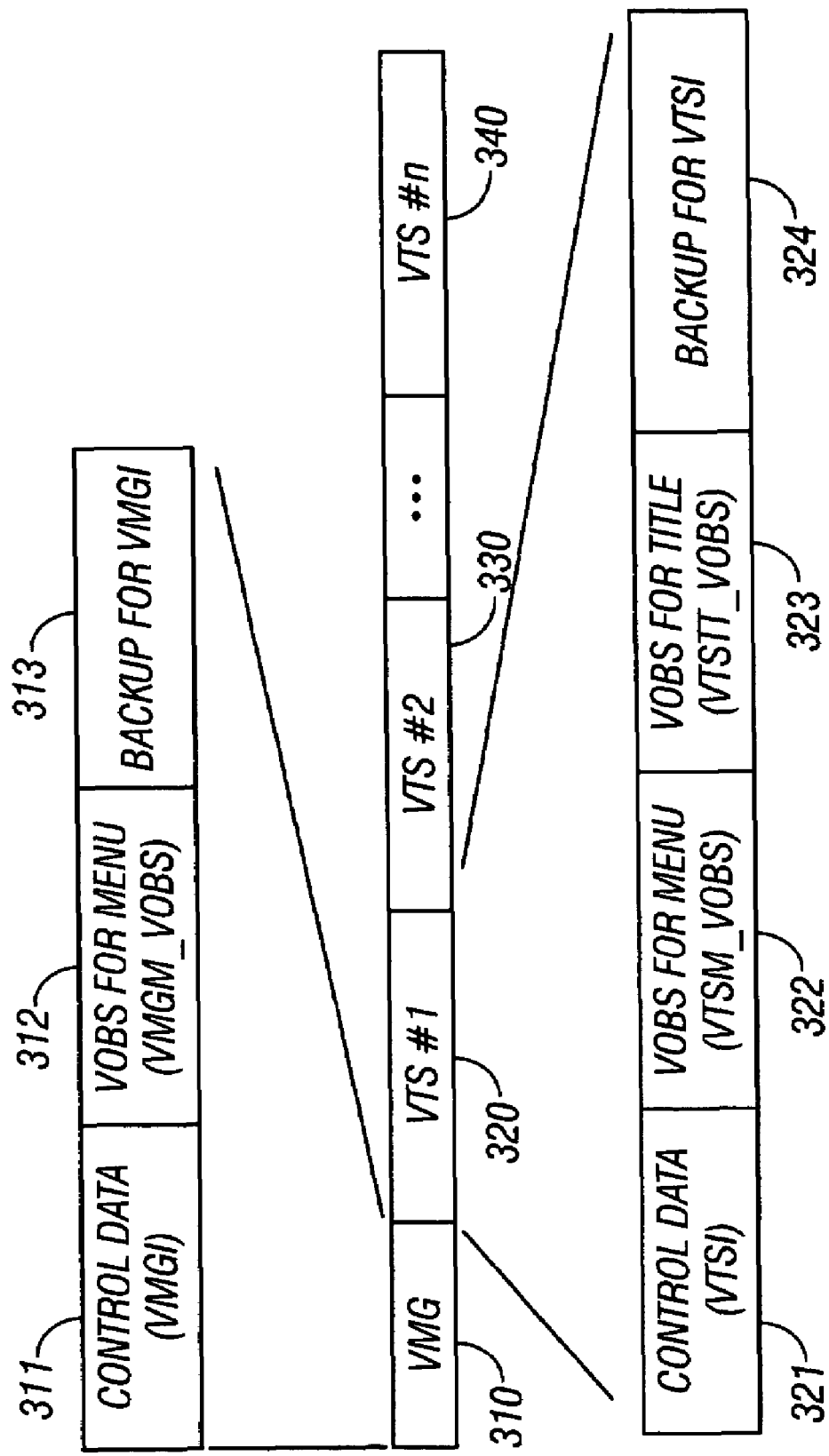
FIG. 4 shows the breakdown of the contents of the DVD-Video zone, to include the control data.
Figure 5:
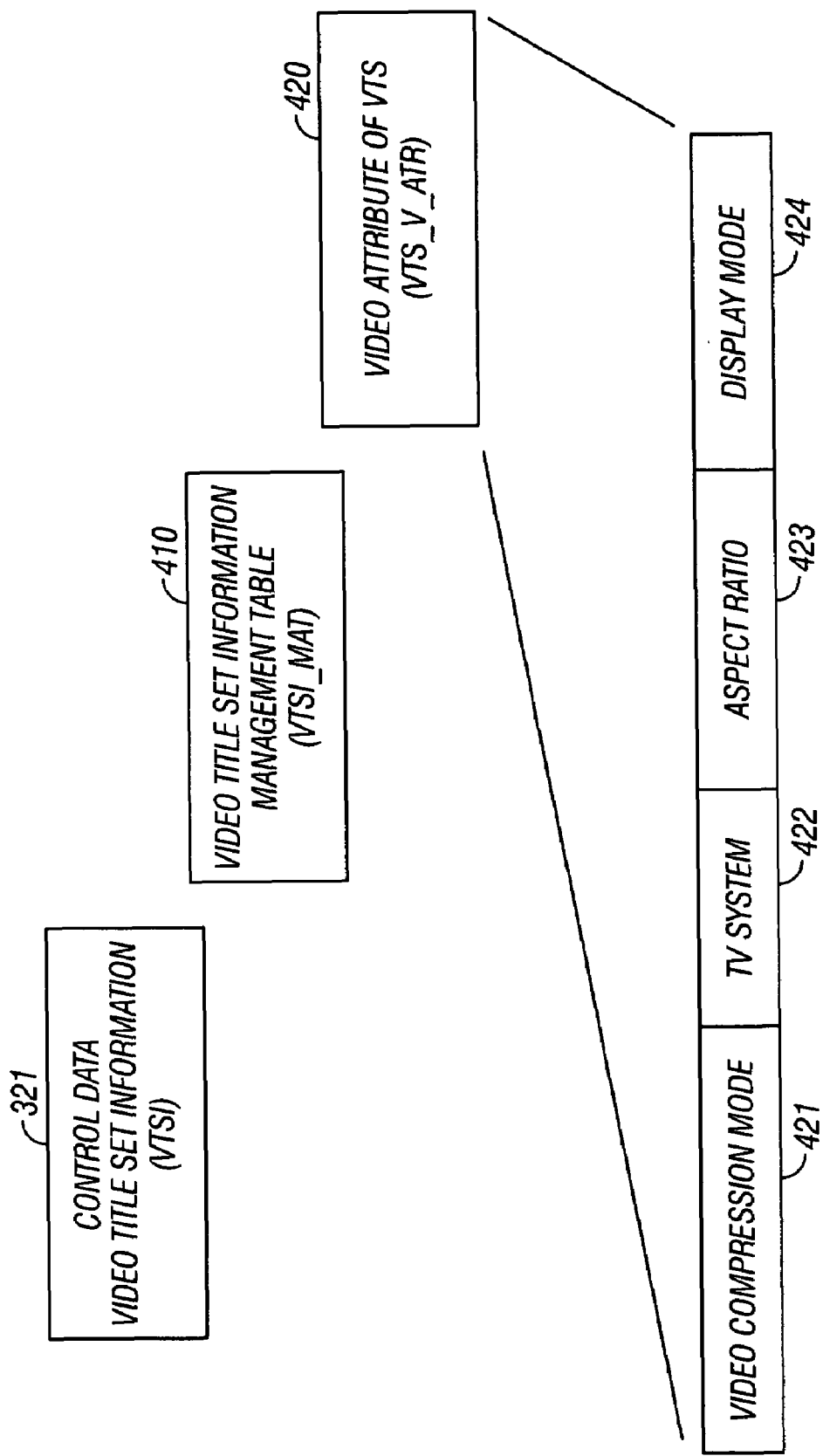
FIG. 5 shows the breakdown of the contents of the control data, to include the aspect ratio of the video stream.

Processor 125 receives input from track buffer 122 regarding the control data of the video title set information 321, (see FIG. 4-5). Control data of the video title set information 321, contains critical logistical information needed by player 101, such as the video compression mode 421, which may designate MPEG 1, 2, or 4. Video compression mode 421 is needed by video decoder 123 to properly decode the video stream. For example, an MPEG-4 encoded video stream needs an MPEG-4 decoder. Processor 125 provides the video compression mode 421 to video decoder 123, for proper decoding of the encoded video stream.

Display 130 has information bearing medium 199 which stores the aspect ratio of display 130. This information bearing medium is typically a semiconductor chip. This information bearing medium can be queried by processor 125, so that processor 125 may obtain the aspect ratio of the video stream and the aspect ratio of the display. Alternately, processor 125 can access display library 198 which has the aspect ratios of known displays stored for recall. The user may access this library via remote 140 and toggle until the correct aspect ratio for display 130 is shown. Therefore the user is able to input the aspect ratio of display 130 via library 198 using remote 140.

FIG. 1 illustrates a typical method of displaying the letterbox video format, by centering image 131 between two horizontal black bands 132 on display 130. As described previously this may result in uneven aging of pixels and pixel burnout on CRT and plasma screens, which may be observable as burned-in images of the bars bracketing the letterbox.

Figure 2:
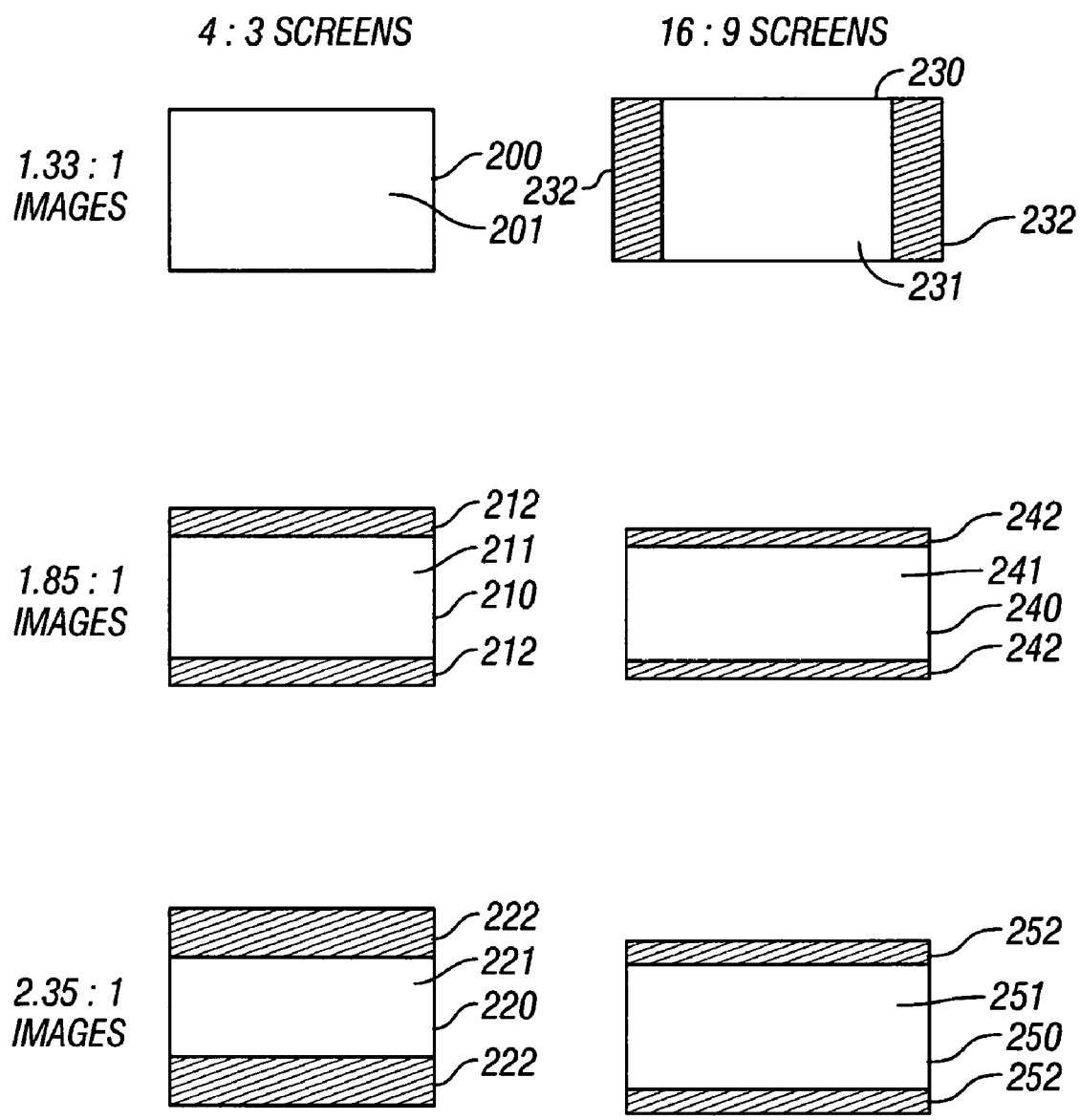
FIG. 2 shows examples of currently implemented video image aspect ratios for common screen and television/motion picture display aspect ratios.

FIG. 2 shows display screens 200, 210, and 220 with an aspect ratio of 4:3. Also shown in FIG. 2 are display screens 230, 240, and 250 with an aspect ratio of 16:9. In FIG. 2, display 200 with an aspect ratio of 4:3 is displaying an image of the video stream 201 with an aspect ratio of 1.33:1. Thus, display 200 does not have the shadowed areas 212 or 222 of displays 210 and 220.

Display 210 has an aspect ratio of 4:3 and is showing image of the video stream 211 with an aspect ratio of 1.85:1. Because the video aspect ratio is greater than the display aspect ratio, horizontal shadow areas 212 are shown when the image of the video stream 211 is centered on display 210. Display 220 has an aspect ratio of 4:3 and is showing letterbox image of the video stream 221 with an aspect ratio of 2.35:1. Because the video aspect ratio is greater than the display aspect ratio, horizontal shadow areas 222 are shown, when the image of the video stream 221 is centered on display 220.

Display 230 has an aspect ratio of 16:9 and is showing image of the video stream 231 with an aspect ratio of 1.33:1. Because the video aspect ratio is smaller than the display aspect ratio, vertical shadow areas 232 are shown when the image of the video stream 231 is centered on display 230. Display 240 has an aspect ratio of 16:9 and is showing letterbox image of the video stream 241 with an aspect ratio of 1.85:1. Because the video aspect ratio is greater than the display aspect ratio, horizontal shadow areas 242 are shown, when the image of the video stream 241 is centered on display 240. Display 250 has an aspect ratio of 16:9 and is showing image of the video stream 251 with an aspect ratio of 2.35:1. Because the video aspect ratio is greater than the display aspect ratio, horizontal shadow areas 252 are shown, when the image of the video stream 251 is centered on display 250.

FIG. 2 shows that shadow areas 212, 222, 232, 242, and 252 occur for both historically popular 4:3 screens as well as newer 16:9 wide screens. In either case, a mismatch between screen aspect ratio and image aspect ratio will result in bars, typically black, being displayed either to the left and right, or on top and bottom, of the centered image. In FIG. 2, shadow areas 212, 222, 232, 242, and 252 are available for uncentering and shifting image of the video streams 211, 221, 231, 241, and 251 respectively. Uncentering of the displayed image may also be applied to all other images whose aspect ratio is not the same as that of the display screen.

Figure 3:
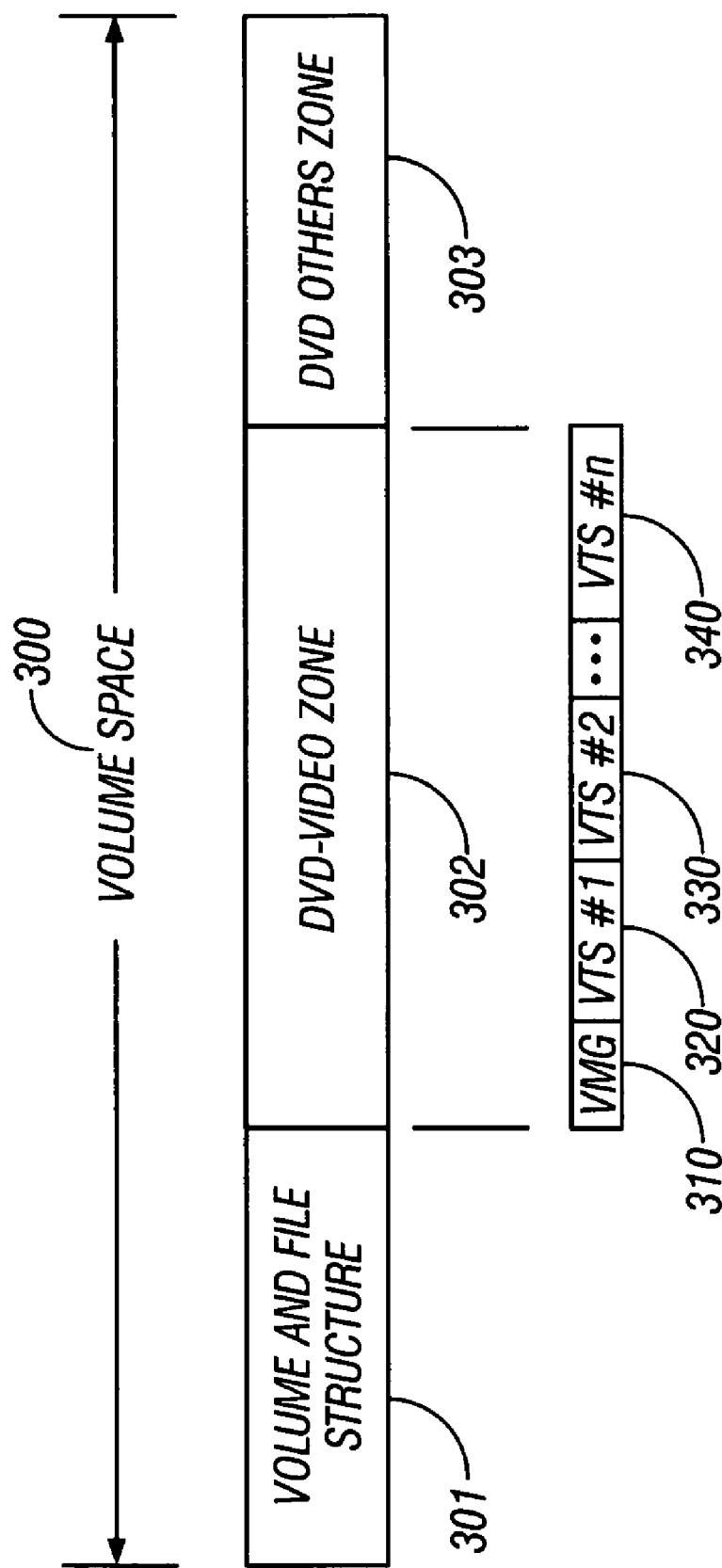
FIG. 3 shows an overview of the volume space on a DVD video disk.

FIG. 3 shows volume space 300 of DVD video disk 110. The volume space 300 is initially divided into three zones: volume and file structure 301, DVD-video zone 302, and DVD others zone 303. DVD-video zone 302 is further divided into video manager VMG 310, and a series of video title sets VTS 320, 330, and 340.

FIG. 4 shows that video manager VMG 310 is further subdivided into control data video manager information VMGI 311, Video object Set VOBS for menu VMGM_VOBS 312, and the backup for the VMGI 313. Each video title set is further subdivided. For example VTS #1 320 is further subdivided into control data video title set information VTSI 321, VOBS (video object set) for video title set menu VTSM_VOBS 322, VOBS for video object set for titles in a VTS VTSTT_VOBS 323, and backup for VTSI 324.

FIG. 5 shows the internal structure of control data video title set information VTSI 321, which is read from DVD video disk 110 before any video steam is displayed. Control data video title set information VTSI 321 contains video title set information management table VTSI_MAT 410. Video title set information management table VTSI_MAT 410 contains video attribute of VTS VTS_V_ATR 420. Video attribute of VTS VTS_V_ATR 420 contains a field which defines the video compression mode 421, TV system 422, aspect ratio of the video 423, and display mode 424. Video compression mode 421 is typically the MPEG encoding of the video stream, such as MPEG 1, 2, or 4. Video compression mode 421 is used by video decoder 123 to properly decode the encoded video stream. The aspect ratio of the video 423 is used in the present invention to obtain the aspect ratio of the video data (explained below with reference to flowchart 600 of FIG. 6).

The image of the video stream shown on display 130 may be in letterbox format, where video 131 is between non-video zones 132. Non-video zones 132 are typically black, but may be any color. Non-video zones 132 may also be referred to as shadow zones. Remote control device 140 may be used to control various display system attributes, in particular in this case controlling the position of the displayed image via the position button 141 and the direction-and-center button 142.

One embodiment of this invention uses machine executed instructions to shift the display of the video stream letterbox view for each viewing session, so that the display of the video stream would not always be centered on the display screen. Shifting the display of the video stream letterbox view for each viewing session would place all pixels of the display in use when averaged over many viewing sessions. In this embodiment, the display of the video stream would not float around the screen in a manner similar to a screen saver. For each viewing session, the display of the video stream would remain in the initially determined screen location.

A second embodiment of this invention allows the user to select the video location. Smaller children may enjoy the video stream being displayed on the bottom of the display screen, because it would be closer to their line-of-sight. Similarly, adults may enjoy the video stream being displayed on the top of the display screen, to match the line-of-sight of an adult. The selection of the position to display the video stream on the display could be accomplished at system setup by choosing a default screen position as an alternative to enabling the system determine the position on the display via machine executed instructions. An override of either the default or system-determined display position could be accomplished dynamically via remote control buttons. An example of such buttons is shown on the remote control depicted in 140 in FIG. 1. The position button 141 could be pressed followed by either one of the arrow or center buttons 142 to place the image of the video stream at the desired location. As shown in FIG. 1, button 142 is a rocker button, which may be rocked to effect the up, down, left, and right arrows. If button 142 is pressed down rather than rocked, the image would be centered on the screen. Button 142 could be subdivided into separate up, down, left, right, and center buttons, if desired. This user-selected position of the display of the video stream could remain in effect for the duration of the current video session, or until the user selected a different image position.

Figure 6:
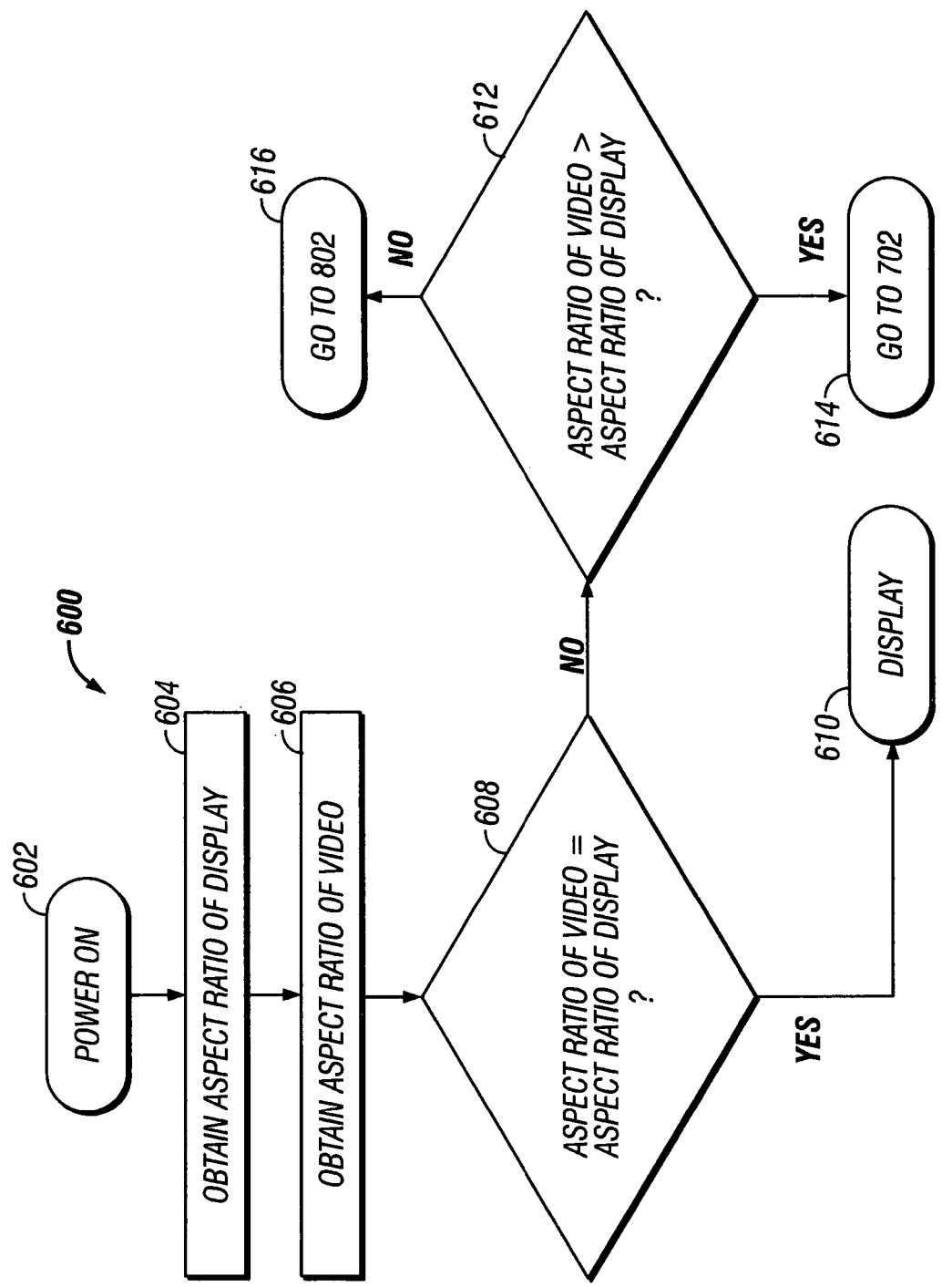
FIG. 6 shows a flowchart of a process to display an image of the video stream consistent with the aspect ratio of the video stream and the aspect ratio of the display.

To more fully explain the operation of the present invention reference is made to flowchart 600 shown in FIG. 6. Flowchart 600 begins at step 602 with start of program or power on. Step 602 flows to step 604, where the aspect ratio of the display is obtained. The aspect ratio of the display is typically 4:3 or 16:9 as shown in FIG. 2; however different aspects ratios may be used with the present invention, without limitation. The aspect ratio of the display may be obtained by various means. For example, the aspect ratio of the display may be obtained from an entry by an operator using remote control 140 anytime during the operation of display system 100. Display system 100 receives the aspect ratio of the display from remote control 140 when processor 125 receives input from remote control 140 via remote uplink 12. The aspect ratio of the display may be obtained from an entry by an operator using remote control 140 in response to a setup menu request during a step up procedure of display system 100. The aspect ratio of the display could be preprogrammed into display system 100 or transmitted from display 130 to display system 100 as part of a power up sequence. For example, display 130 may use information bearing medium 199 to store the aspect ratio of display 130. Information bearing medium 199 may be queried by processor 125, so that processor 125 may determine the aspect ratio of the video stream. Alternately, processor 125 may access display library 198 which has the aspect ratios of known displays stored for recall. The user may access this library via remote 140 and toggle until the correct aspect ratio for display 130 is shown.

Step 604 then flows to step 606, where the aspect ratio of the video stream is obtained. If the source of the displayed video is a DVD video disk (i.e. disk 110), then the aspect ratio of the video stream is preferably the aspect ratio 423 as read from DVD video disk 110. The aspect ratio of the video stream may be obtained from the DVD video disk. For example, the aspect ratio of the video stream may be obtained from aspect ratio 423 by player 101 reading control data video title set information (VTSI) 321 from disk 110 before the video stream is read, decoded, and displayed. If the source of the video is a VCR then the aspect ratio of the video stream from a VHS tape, may be obtained by, for example, processing the video signal using a processor (i.e. processor 125). Alternatively, if the source of the displayed video is from a source other than a DVD or if it is not possible to obtain aspect ratio 423 from the video stream then the aspect ratio of the video stream may be obtained by other means. The aspect ratio of the video stream may also be obtained from a remote control. For example, the aspect ratio of the video stream may be obtained by entry from an operator using remote control 140 in response to a setup menu request during a setup procedure of display system

100. Display system 100 receives the aspect ratio of the video stream from remote control 140 when processor 125 receives input from remote control 140 via remote uplink 12. The aspect ratio of the video stream could also be preprogrammed into display system 100. Upon exiting step 606, processor 125 has access to stored values or representations of the aspect ratio of both the video stream and the display.

The process then flows from step 606 to decision step 608, to determine whether the aspect ratio of the display is different than the aspect ratio of the video stream. One example of equal aspect ratios is when the video aspect ratio is 1.33:1 and the display aspect ratio is 4:3. A second example of equal aspect ratios is when the video aspect ratio is 1.78:1 and the display aspect ratio is 16:9. It is sufficient that this equality is determined only to the second decimal place. If at step 608, the video stream aspect ratio is the same as the display aspect ratio, then the process flows to step 610 where the image of the video stream is displayed on the display without further processing. When the aspect ratios are the same, there are no shadow zones to shift the image of the video stream to, because the size of the image of the video stream matches the size of the display.

If the aspect ratio of the display and the video stream are different at step 608, the process flows to step 612 where the determination is made whether the aspect ratio of the video stream is larger than the aspect ratio of the display. If at step 612, the aspect ratio of the video stream is larger than the aspect ratio of the display, then the process flows to step 614. At step 614 the process transfers to step 702 of flowchart 700 shown in FIG. 7 to determine the vertical shift of the image of the video stream on the display to uncenter the image (explained below).

If at step 612, the video aspect ratio is not larger than the display aspect ratio, the process flows to step 616. From step 616, the process branches to step 802 of FIG. 8 to determine the horizontal shift of the image of the video stream on the display (explained below).

Figure 7:
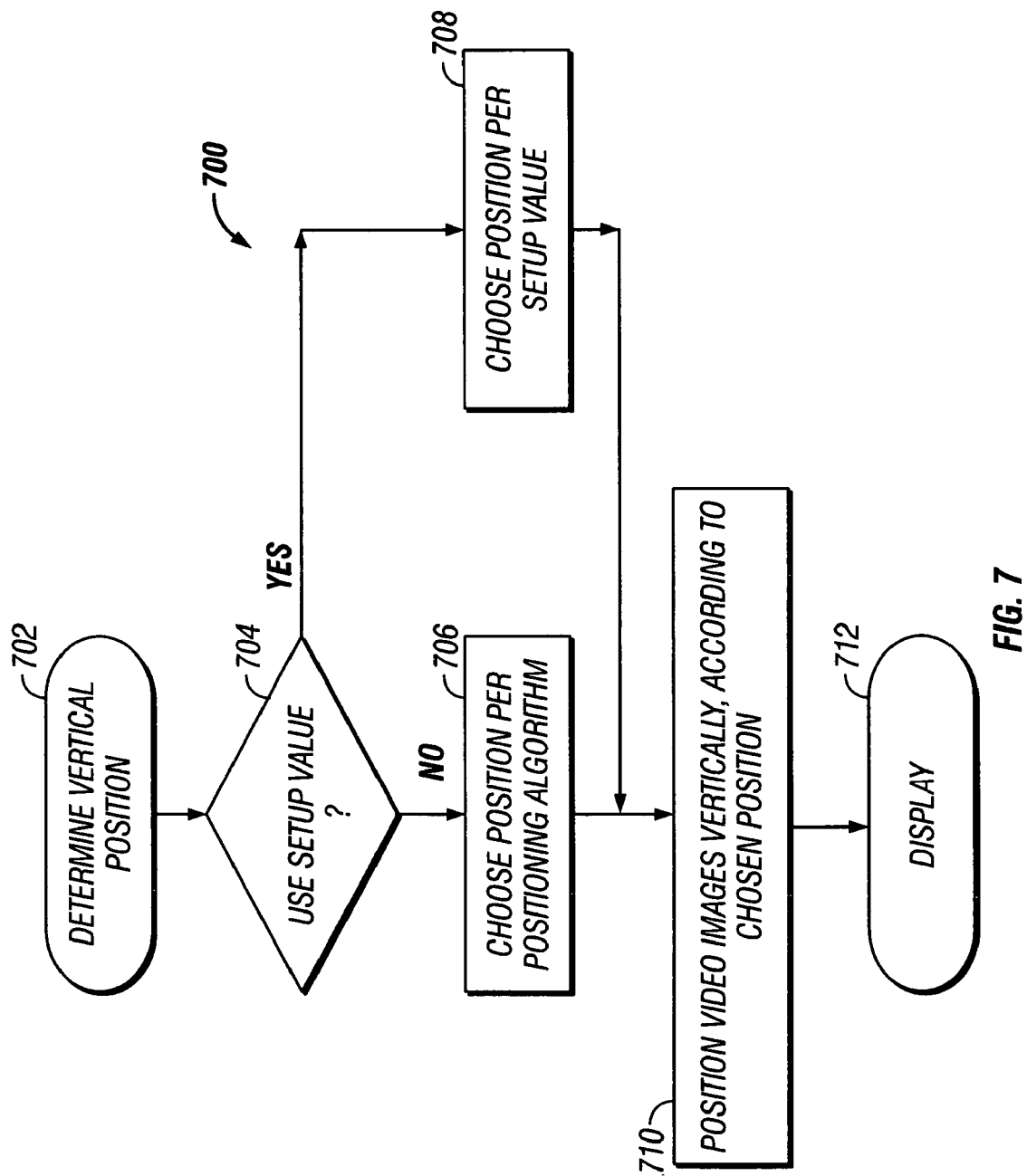
FIG. 7 shows a flowchart of a process to shift the display of an image of the video stream vertically.

Flowchart 700 shown in FIG. 7 illustrates a method to shift the image of the video stream on a display (i.e. display(s) 130, 210, 220, 240, 250) where there are available shadow areas 212, 222, 242, 252 (see FIG. 2) for vertically uncentering the image of the video stream to produce a vertical shift of the image on the display. The process of flowchart 700 is executed in response to determining that the aspect ratio of the display is different than the aspect ratio of the video stream. Execution of the process of flowchart 700 results in positioning the image of the video stream on the display to uncenter the image on the display. Uncentering of the image of the video stream on the display is the result of any shift in the image from the exact center of the display. Processor 125 may be used to execute instructions to implement the process of flowchart 700 or 800. The process flows to decision step 704, to determine whether to apply a positioning algorithm or use the selected setup position to vertical shift the image of the video stream on the display. If at step 704 the decision is to not use the setup value, then the process flows to step 706, where the positioning algorithm is used to select a screen position. If at step 704 the decision is to use the setup value, then the process flows to step 708, where the set up value is used to select a screen position.

At step 706 a vertical shifting algorithm is chosen to automatically shift the image of the video stream on the display. In one embodiment the automatic shift of the image of the video stream on the display may be accomplished by selecting a random position of the image on the display at a selected interval and the displaying the image on the display at the random position. The selected interval may be for example the interval between power up cycles of a display system, each time a new video source is inserted (i.e. each time a DVD disk is played), at a user selected interval, at a random interval determined by a processing element (i.e. processor 125), each time the video is paused, etc. In one example of this embodiment the vertical shifting algorithm comprises selecting a random vertical shift integer, $S_v$, between $-N*I$ and $N*I$, where I is an increment number to modify the granularity of the shift and N is preferably an even number that is the normalized total amount of vertical shift necessary to eliminate one of shadow areas 212, 222, 242 or 252. The vertical shift integer, $S_v$, may be selected using techniques of random number generation as is known in the art, resulting in a range of $N*I \leq S_v \leq N*I$. A vertical shift integer, $S_v$, value of n results in a position the image $n/(N*I)$ increments up/down from the center. Thus, a vertical shift integer, $S_v$, value of $-N*I$ results in the position of the image of the video stream shifted to the top of the display, while a vertical shift integer, $S_v$, value of $+N*I$ results in the position of the image of the video stream shifted to the bottom of the display. A vertical shift integer, $S_v$, value of 0 results in the position of the image of the video stream being in the center of the display. In a preferred embodiment N is determined by dividing the total height of one shadow area by the total height of the display and then taking the integer value. A typical value of increment number, I, is 100. In equation form: N=Integer value (shadow height/display height). The resulting percentage shift of the display, shift percentage=$S_v/I$. For example if in FIG. 2, shadow area 212 is 20% of the total display height, area 211 is 60% of the total display height and choosing I=100, then $N*I$=Integer value (100*0.2/(0.2+0.2+0.6)), resulting in $N*I$ =20. If $S_v=-20$ then the image of the video stream is shifted to the top of the display. If $S_v=10$ then the image of the video stream is shifted down from center by a shift percentage=10/I or 10% of the display area. For this example, random values of $S_v$ are chosen from the range of $-20 \leq S_v \leq 20$ to produce a vertical shift of +/-20% resulting in the image of the video stream covering a range of the top of the display to the bottom of the display but never resulting in a loss of any portion of the image on the display. Alternatively, instead of using a random number generator to choose the values of $S_v$, $S_v$ may be chosen by incrementing through the entire range of $S_v$, one step at a time for each time the system is powered on. For example, upon the first power up of display system 100, a value of $-20$ may be chosen for $S_v$, upon the next power up the value of $-19$ may be chosen for $S_v$, continuing on until $S_v=20$, and then starting again at $-20$ on the next power up to repeat the entire sequence.

If at step 704, the setup value to shift the image on the display is chosen, then the process flows to step 708, where the value entered on a setup screen is used for vertical shift integer, $S_v$. The discussion above for the range of vertical shift integer, $S_v$, applies. The default value for the setup position may result in a value of $S_v=0$, or other default values may be used without limitation. A user of display system 100 would have the option to change the default value for $S_v$ or enter any value for at any time. The setup screen may prompt the user for an input value of $S_v$, and only accept valid values for $S_v$ to ensure that the system could operate properly. After execution of either of steps 706 or 708 control flows to step 710 where the image is placed at a position determined by the shift resulting from the execution of either of steps 706 or 708. This shift is preferably accomplished in display buffer 124 by calculations executed by processor 125. Control then flows to step 712 to display the image of the video stream on the display. Alternatively, a setup screen may not be used. A user may use the remote control to interrupt the display of the image at any time (See Flowchart 900). In the preferred embodiment, display system 100 receives a position from a remote control that results in displaying the image on the display at a position determined by the received position from the remote control.

Figure 8:
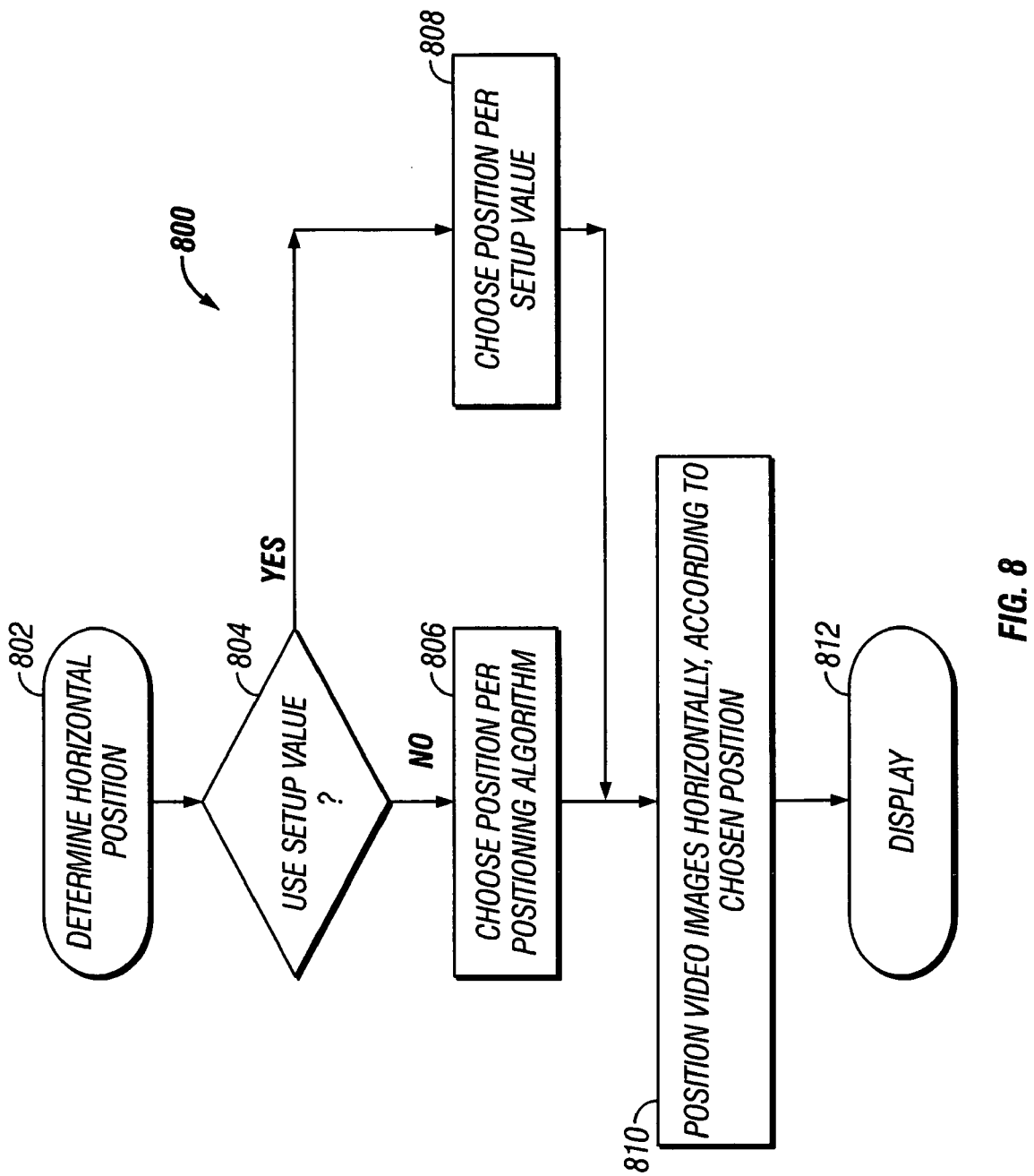
FIG. 8 shows a flowchart of a process to shift the display of an image of the video stream horizontally.

If the execution of step 616 resulted in the execution of step 618, then control transfers to step 802 of flowchart 800 to shift the image of the video stream in a horizontal direction. The process of flowchart 800 is executed in response to determining that the aspect ratio of the display is different than the aspect ratio of the video stream. Execution of the process of flowchart 800 results in positioning the image of the video stream on the display to uncenter the image on the display. Uncentering of the image of the video stream on the display is the result of any shift in the image from the exact center of the display. Flowchart 800 in FIG. 8 illustrates a process for shifting of the image of the video stream where there are available shadow areas 232 for horizontally uncentering the image of the video stream. Upon entering step 802, the process flows to decision step 804, to determine whether to apply a positioning algorithm or use the selected setup position to horizontal shift the image of the video stream on the display. If at step 804, the decision is to not use the set up value, then the process flows to step 806, where the positioning algorithm is used to select a screen position. If at step 804 the decision is to use the setup value, then the process flows to step 808, where the setup value is used to select a screen position.

At step 806 a horizontal shifting algorithm is chosen to automatically shift the image of the video stream on the display. In one embodiment the horizontal shifting algorithm comprises selecting a random horizontal shift integer, $S_h$, between $-N*I$ and $N*I$, where I is an increment number to modify the granularity of the shift and N is preferably an even number and is the normalized total amount of horizontal shift necessary to eliminate one of shadow areas 232 The horizontal shift integer, $S_h$, may be selected using techniques of random number generation as is known in the art, resulting in a range of $N*I \leq S_h \leq N*I$. A horizontal shift integer, $S_h$ value of n results in a position of the image n/(N*I) increments left/right from the center. Thus, a horizontal shift integer, $S_h$ value of $-N*I$ results in the position of the image of the video stream shifted to the left of the display, while a horizontal shift integer, $S_h$ value of $+N*I$ results in the position of the image of the video stream shifted to the right of the display. A horizontal shift integer, $S_h$ value of 0 results in the position of the image of the video stream being in the center of the display. In a preferred embodiment, N is determined by dividing the total width of one shadow area by the total width of the display and then taking the integer value. A typical value of increment number I may be 100. In equation form: N=Integer value (shadow width/display width). The resulting percentage shift of the display, shift percentage=$S_h$/I. For example, if in FIG. 2, shadow area 232 is 30% of the total display width and area 231 is 40% of the total display width and choosing I=100, then N*I=Integer value (100*0.3/(0.3+0.3+0.4)), resulting in N*I =30. If $S_h$=−30 then the image of the video stream is shifted to the left portion of the display producing no shadow area on the left but a larger shadow area on the right. If $S_h$=10 then the image of the video stream is shifted right from center by a shift percentage=10/I or 10% of the display area. For this example, random values of $S_h$ are chosen from the range of $-30 \leq S_h \leq 30$ to produce a horizontal shift of +/−30% resulting in the image covering a range of the left of the display to the right of the display but never resulting in a loss of any portion of the image on the display. Alternatively, instead of using a random number generator to choose the values of $S_h$, $S_h$ may be chosen by incrementing through the entire range of $S_h$, one step at a time for each time the system is powered on. For example, upon the first power up of display system 100, a value of −30 may be chosen for $S_h$, upon the next power up the value of −29 may be chosen for $S_h$, continuing on until $S_h$=30, and then starting again at −30 on the next power up to repeat the entire sequence.

If at step 804, the setup value to shift the image on the display is chosen, then the process flows to step 808, where the value entered on a setup screen or a default value is used for $S_h$. The discussion above for the range of $S_h$ applies. One of the components of display system 100 (i.e. display buffer 124) may receive a default position from a processor (i.e. processor 125) of display system 100 causing the displaying the image on the display at a position determined by the default position. The default value for the setup position may result in a value of $S_h$=0, or other default values may be used without limitation.

A user of display system 100 would have the option to change the default value for $S_h$ or enter any value at any time. The setup screen may prompt the user for an input value of $S_h$, and only accept valid values for $S_h$ to ensure that the system would operate properly. After execution of either of steps 806 or 808, control flows to step 810 where the image of the video stream is placed at a position determined by the shift resulting from the execution of either of steps 806 or 808. This shift is preferably accomplished in display buffer 124 by calculations executed by processor 125. Control then flows to step 812 to display the image of the video stream on the display. Alternatively, a setup screen may not be used. A user may use the remote control to interrupt the display of the image at any time (See Flowchart 900). In the preferred embodiment display system 100 receives a position from a remote control that results in displaying the image on the display at a position determined by the received position from the remote control.

Figure 9:
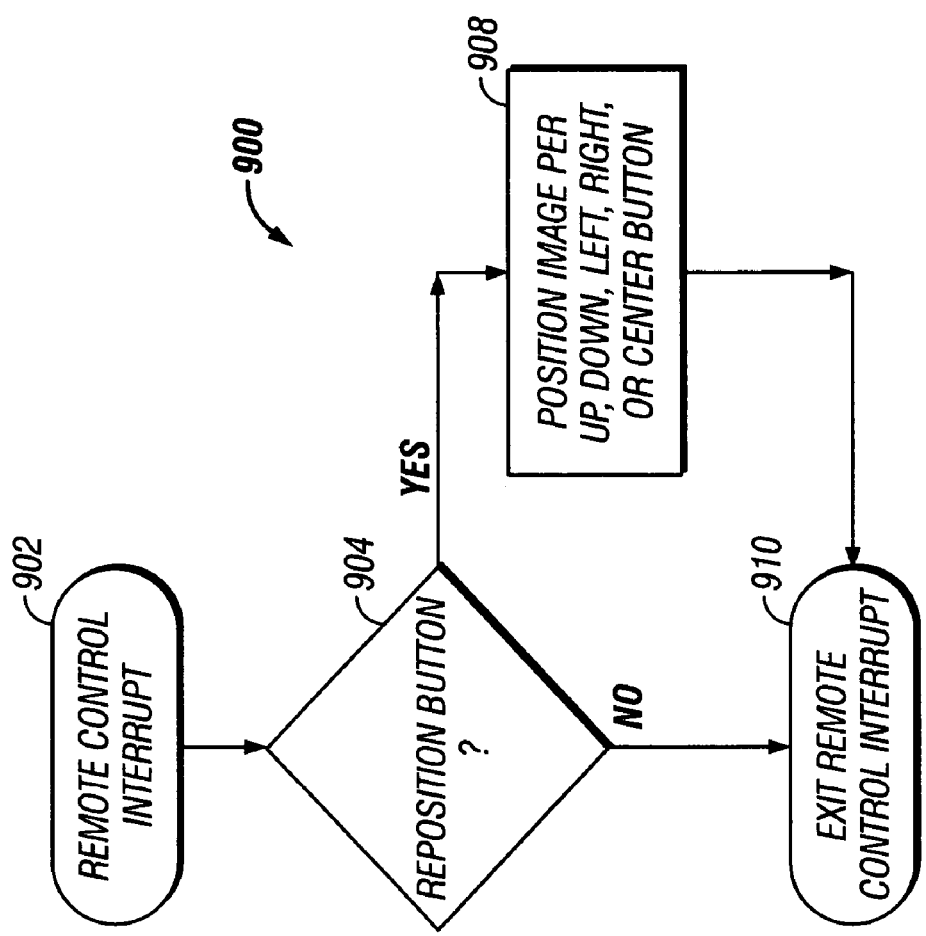
FIG. 9 shows a flowchart of a process to use a remote control input for the present invention.

Flowchart 900, shown in FIG. 9 shows processing for a remote control interrupt. The process of flowchart 900 may be used anytime input from remote control 140 is used by display system 100. The process of flowchart 900 may be implemented by processor 125, other components within display system 100, remote control 140 or associated components. Step 902 begins when a button on the remote control 140 is pressed, for example to input the position to display the image of the video stream on a display (i.e. steps 708, 808). The process flows to decision step 904, to determine if the button pressed was the position button 141 or another button. If position button 141 was not pushed or activated, then step 904 transfers control to step 910, where the process exits. If position button 141 was pushed or activated, then step 904 transfers control step 908, where the image of the video stream is positioned at top, bottom, left, right, or center, of a display according to, respectively, the up, down, left, right, or center button 142 being pressed. The process then flows from step 908 to step 910, which exits the remote control interrupt processing. Similar processing for dynamic user-selected positioning could also be done via a touch screen feature where the touch screen may be part of remote control 140, display system 100, display 130 or other components within display system 100. Voice activation may also be used to input position information for the display of the image. Voice recognition elements may be used to process voice commands to move the image on the display. The voice recognition elements may be coupled to or located within remote control 140, display system 100, display 130 or another component of display system 100. The voice activation could operate by receiving a position from a voice input from the voice activation element and displaying the image on the display at a position determined by the position from the voice input. For example, a user may say "move the image down" and the image would move down by a fixed increment (i.e. vertical shift integer, $S_v$). Other voice commands may be processed by the voice activation element to move the image in any direction.

Figure 10:
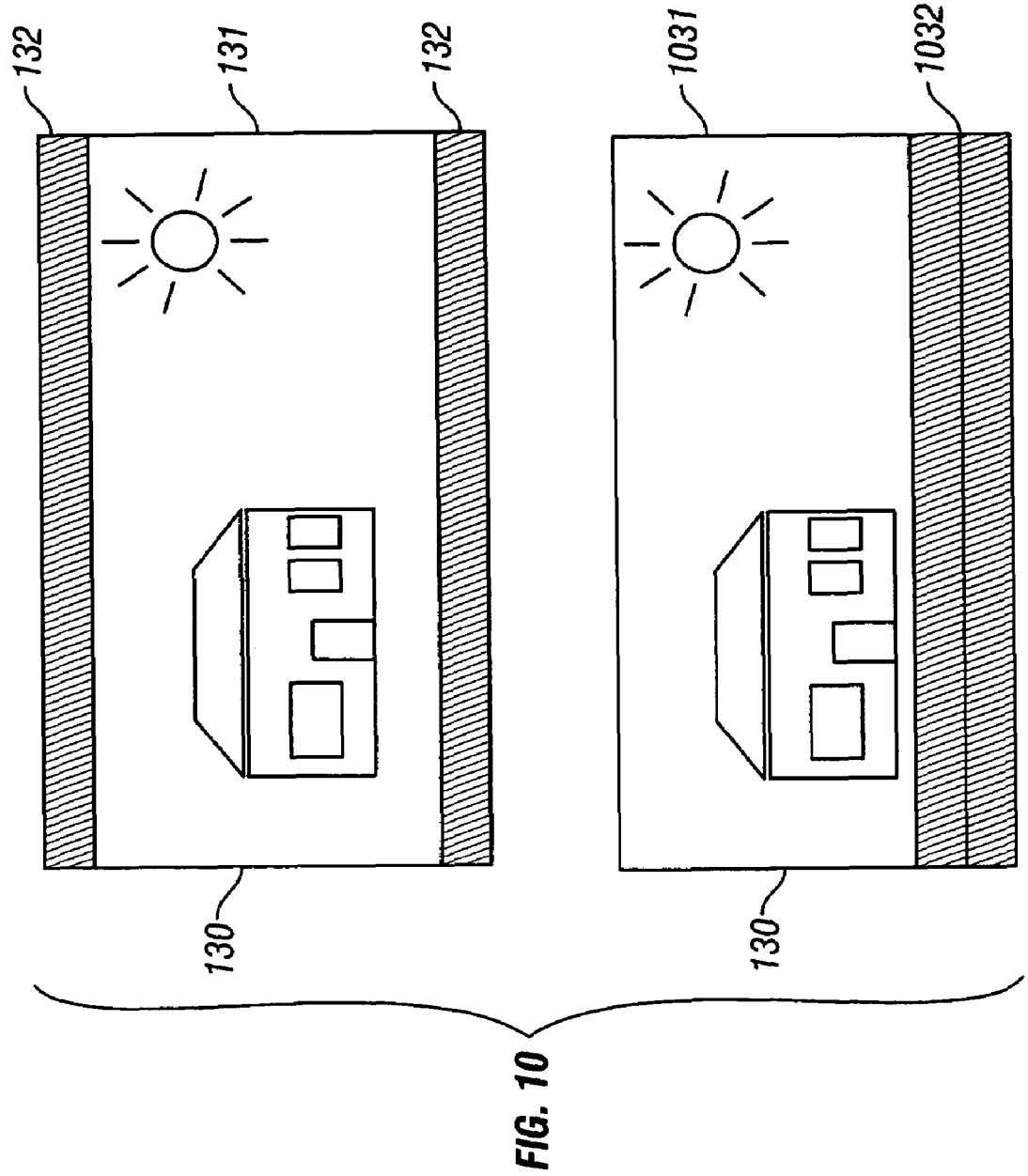
FIG. 10 illustrates the display of an image of the video stream that is uncentered and repositioned to the top of the display.

FIG. 10 shows display 130 with image of the video stream 131 where the image of the video stream has a larger aspect ratio than the display. If centered, image of the video stream 131 is between non-video shadow zones 132. This is assuming that the user has either selected centering at setup or dynamically selected a centered position using the remote control. If either at setup, via remote control, or via the positioning algorithm, the image is selected to be positioned at the top of the screen, then the image of the video stream 1031 is shown at the top of display 130, and expanded shadow zone 1032 is shown at the bottom of display 130. Shadow zone 1032 of the uncentered image of the video stream 1031 is the total size of previous shadow zones 132 of the centered image of the video stream 131.

The choice of displayed video aspect ratio of a DVD video disk 110 is typically made by the user when the video disk is first loaded into the DVD player. When the choice is made in viewing mode, such as the generic "letterbox" mode where the aspect ratio of the video stream is larger than the display, the exact aspect ratio of the video may be read from the DVD disk using aspect ratio 423. In a preferred embodiment as shown in flowcharts 600, 700, and 800 the user could allow the image of the video stream to be positioned other than centered for viewing, depending on the aspect ratio of the display and the image of the video stream. The image of the video stream could be displayed in the chosen position for the duration of the power-on period. The chosen video position could alternately be re-selected at other intervals, such as a channel changes or on midnight crossings. The selection of image of the video stream location could be done in the television itself, where it would apply to all image sources, including cable, satellite, and over the air broadcasts, or in either the DVD player or a VHS player if the video stream is stored on tape.

This uncentering of the image of the video stream could be constant for the entire power-on period of the display, or for some other determined period, in order lengthen pixel life. This would be implemented by a simple horizontal or vertical "DC offset" to the pixel mapping onto the viewing screen. This offset to the pixel mapping would typically occur in display buffer 124 of FIG. 1.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings.

The logic of FIGS. 6-9 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 6-9 was described as being implemented in software. This logic may be part of the operating system of display system 100 or an application program. In yet further implementations, this logic may be maintained in storage areas managed by display system 100 or in a read only memory or other hardwired type of device. The preferred logic may be implemented in hard disk drives or in programmable and non-programmable gate array logic. Processor 125 may be configured to implement logical processing to implement the present invention.

The invention disclosed herein may be implemented as a method, apparatus or article of manufacture using standard programming and/or engineering techniques to produce software, firmware, hardware, or any combination thereof. The term article of manufacture as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, hard disk drives, floppy disks, tape, etc.), optical storage (CD-ROMs, optical disks, etc.), volatile and non-volatile memory devices (e.g., HEPROMs, ROMs, PROMs, RAMs, DRAMs, SRAMs, firmware, programmable logic, etc.). Code in the computer readable medium is accessed and executed by a processor. The code may further be accessible through a transmission media or from a file server over a network. Of course, those skilled in the art will recognize that many modifications may be made to this configuration without departing from the scope of the present invention, and that the article of manufacture may comprise any information bearing medium known in the art.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for displaying an image of a video stream on a display system, said method comprising:
   coupling a player to a display for displaying an image of a video stream, wherein said player includes
      a display buffer for buffering and processing said video stream and providing said video stream to said display; and
      a processor for controlling said display buffer, wherein said processor in capable of
         obtaining an aspect ratio of said display;
         obtaining an aspect ratio of said video stream;
         determining whether said aspect ratio of said display is different than said aspect ratio of said video stream; and
         responsive to determining that said aspect ratio of said display is different than said aspect ratio of said video stream, positioning said image of said video stream on said display to uncenter said image on said display.

2. The method of claim 1, wherein obtaining an aspect ratio of said display further comprises:
receiving said aspect ratio of said display from a remote control.

3. The method of claim 1, wherein obtaining an aspect ratio of said video stream further comprises:
receiving said aspect ratio of said video stream from a remote control.

4. The method of claim 1, wherein obtaining an aspect ratio of said video stream further comprises:
obtaining said aspect ratio of said video stream from a DVD video disk.

5. The method of claim 1, wherein obtaining an aspect ratio of said video stream further comprises:
obtaining said aspect ratio of said video stream from a VHS tape.

6. The method of claim 1, wherein positioning said image of said video stream on said display to uncenter said image on said display further comprises:
selecting a random position of said image on said display at a selected interval; and
displaying said image on said display at said random position.

7. The method of claim 6, wherein said selected interval is the interval between power up cycles of a display system.

8. The method of claim 6, wherein said selected interval is the interval between each time a DVD disk is played.

9. The method of claim 1, wherein positioning said image of said video stream on said display to uncenter said image on said display further comprises:
receiving a position from a remote control; and
displaying said image on said display at a position determined by said received position from said remote control.

10. The method of claim 1, wherein positioning said image of said video stream on said display to uncenter said image on said display further comprises:
receiving a default position from a processor of a display system; and displaying said image on said display at a position determined by said default position.

11. The method of claim 1, wherein positioning said image of said video stream on said display to uncenter said image on said display further comprises:
receiving a position from a voice input; and
displaying said image on said display at a position determined by said position from said voice input.

12. A display system, comprising:
a display for displaying an image of a video stream;
a player coupled to said display, comprising:
a display buffer for buffering and processing said video stream and providing said video stream to said display;
a processor for controlling said display buffer, wherein said processor is configured to:
obtain an aspect ratio of said display;
obtain an aspect ratio of said video stream;
determine whether said aspect ratio of said display is different than said aspect ratio of said video stream; and
responsive to determining that said aspect ratio of said display is different than said aspect ratio of said video stream, positioning said image of said video stream on said display to uncenter said image on said display.

13. The system of claim 12, further comprising:
a remote control; and
a remote uplink for receiving information from said remote control, wherein said remote uplink is coupled to said processor and said processor is further configured to receive said aspect ratio of said display from said remote control.

14. The system of claim 12, further comprising:
a remote control; and
a remote uplink for receiving information from said remote control, wherein said remote uplink is coupled to said processor and said processor is further configured to receive said aspect ratio of said video stream from a remote control.

15. The system of claim 12, further comprising:
a DVD video disk for supplying video data to a video decoder, wherein said video decoder processes said video data to produce said video stream, and wherein said processor is further configured to obtain said aspect ratio of said video stream from said DVD video disk.

16. The system of claim 12, further comprising:
a VHS tape for supplying video data to a video decoder, wherein said video decoder processes said video data to produce said video stream, and wherein said processor is further configured to obtain said aspect ratio of said video stream from said VHS tape.

17. The system of claim 12, wherein said processor is further configured to:
select a random position of said image on said display at a selected interval; and display said image on said display at said random position.

18. The system of claim 17, wherein said selected interval is the interval between power up cycles of said display system.

19. The system of claim 17, wherein said selected interval is the interval between each time a DVD disk is played.

20. The system of claim 12, further comprising:
a remote control; and
a remote uplink for receiving information from said remote control, wherein said remote uplink is coupled to said processor and said processor is further configured to receive a position from said remote control and display said image on said display at a position determined by said received position from said remote control.

21. The system of claim 12, wherein said processor is further configured to display said image on said display at a default position.

22. The system of claim 12, further comprising:
a voice activation element coupled to said processor, wherein said processor is further configured to receive a position from a voice input from said voice activation element and display said image on said display at a position determined by said position from said voice input.

23. An article of manufacture comprising a data storage medium tangibly embodying a program of machine-readable instructions executable by a digital processing apparatus to perform method steps for displaying an image of a video stream on a display, said method steps comprising:
coupling a player to a display for displaying an image of a video stream, wherein said player includes
a display buffer for buffering and processing said video stream and providing said video stream to said display; and a processor for controlling said display buffer, wherein said processor in capable of
obtaining an aspect ratio of said display;
obtaining an aspect ratio of said video stream;
detennining whether said aspect ratio of said display is different than said aspect ratio of said video stream; and
responsive to determining that said aspect ratio of said display is different than said aspect ratio of said video stream, positioning said image of said video stream on said display to uncenter said image on said display.

24. The article of manufacture of claim 23, wherein obtaining an aspect ratio of said display further comprises:
receiving said aspect ratio of said display from a remote control.

25. The article of manufacture of claim 23, wherein obtaining an aspect ratio of said video stream further comprises:
receiving said aspect ratio of said video stream from a remote control.

26. The article of manufacture of claim 23, wherein obtaining an aspect ratio of said video stream further comprises:
obtaining said aspect ratio of said video stream from a DVD video disk.

27. The article of manufacture of claim 23, wherein obtaining an aspect ratio of said video stream further comprises:
obtaining said aspect ratio of said video stream from a VHS tape.

28. The article of manufacture of claim 23, wherein positioning said image of said video stream on said display to uncenter said image on said display further comprises:
selecting a random position of said image on said display at a selected interval; and
displaying said image on said display at said random position.

29. The article of manufacture of claim 28, wherein said selected interval is the interval between power up cycles of a display system.

30. The article of manufacture of claim 28, wherein said selected interval is the interval between each time a DVD disk is played.

31. The article of manufacture of claim 23, wherein positioning said image of said video stream on said display to uncenter said image on said display further comprises:
receiving a position from a remote control; and
displaying said image on said display at a position determined by said received position from said remote control.

32. The article of manufacture of claim 23, wherein positioning said image of said video stream on said display to uncenter said image on said display further comprises:
receiving a default position from a processor of a display system; and
displaying said image on said display at a position determined by said default position.

33. The article of manufacture of claim 23, wherein positioning said image of said video stream on said display to uncenter said image on said display further comprises:
receiving a position from a voice input; and
displaying said image on said display at a position determined by said position from said voice input.

* * * * *